March 15, 1938. J. L. A. A. MOULET 2,111,000
LIQUID FUEL PUMP
Filed June 15, 1936 3 Sheets-Sheet 2

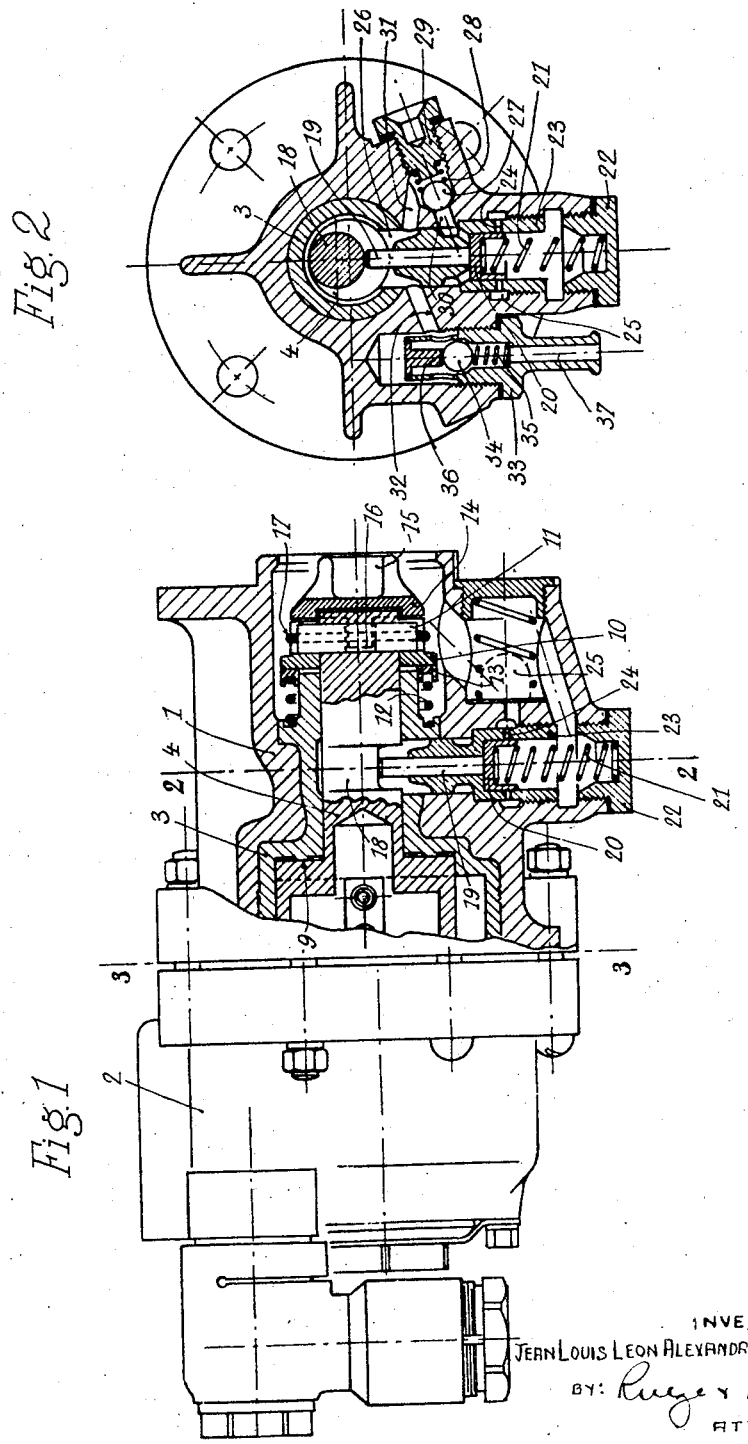

INVENTOR:
JEAN LOUIS LEON ALEXANDRE ALBERT MOULET
BY: Ruege + Boyee
ATTORNEYS

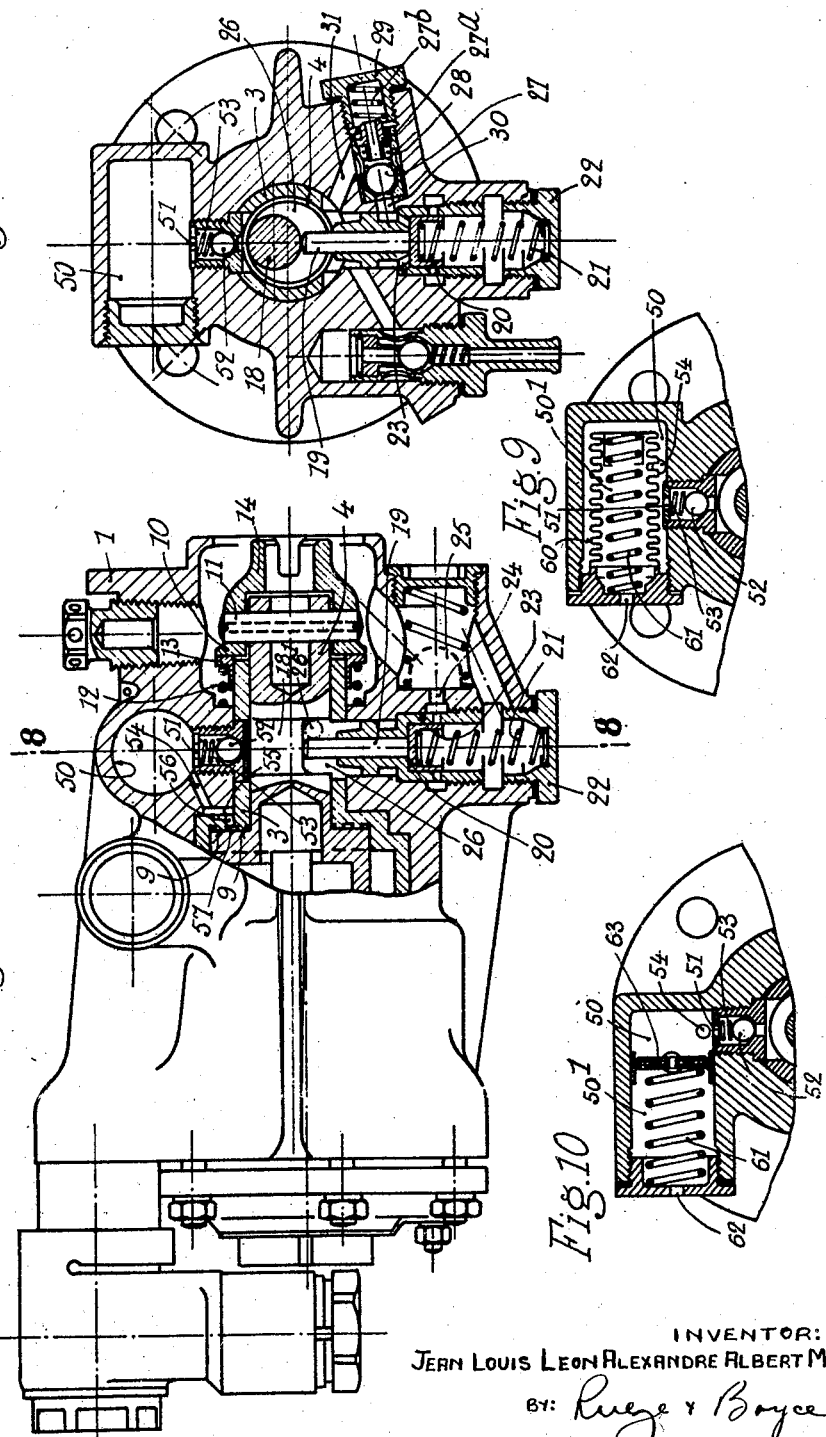

Patented Mar. 15, 1938

2,111,000

UNITED STATES PATENT OFFICE 2,111,000

LIQUID FUEL PUMP

Jean Louis Léon Alexandre Albert Moulet, Boulogne-sur-Seine, France, assignor to Martin Moulet & Cie., Oullins, France Application June 15, 1936, Serial No. 85,264
In France July 25, 1935

3 Claims. (Cl. 103—116)

The present invention relates to improvements in pumps of the type lubricated under pressure, particularly in fuel pumps for the supply of explosion or internal combustion engines.

The invention consists in the provision of means, comprising an oil pump, for ensuring, during operation, a lubrication under constant pressure of all the parts necessitating such lubrication and also ensuring a tight joint between the pump and the outside, said means being combined with a device operating automatically at rest, ensuring a rapid priming up of the oil pump and further not allowing the pumped liquid to come into contact with the driving members of the pump.

These combined means constitute a safety device which checks, either under operating conditions or at rest, any leakage, were it accidental, of the pumped liquid towards the driving members of the pump, particularly in such a manner that in the case of a fuel pump mounted directly on an engine and driven by the latter, the fuel will never flow to the inside of the engine by leaking along the driving shaft.

According to a further feature of the invention which may be considered in combination with a fluid pump in which the pressure of the lubricant is obtained either by means of an oil pump combined with the fluid pump or by means of a pump located in any suitable place and connected with the fluid pump by means of a conduit, the fluid pump further comprises an oil accumulator, connected on one hand to the source which provides the oil at a pressure higher than that of the pump liquid, and on the other hand to one or more grooves of suitable form, provided in a thrust bearing of the driving shaft of the pump, said thrust bearing forming an oil tight bushing between the pumped liquid and the outside of the pump.

According to this arrangement, the lubricating means, which is active only when the pump is rotating, pumps into the accumulator a certain amount of oil by compressing either the air previously contained in the accumulator or a compressible member provided in said accumulator. A valve or other convenient means checks the return flow of the oil towards the source of lubricant under pressure. This oil, maintained under pressure, may thus flow only towards the groove or grooves provided in said thrust bearing of the driving shaft of the pump, thus lubricating said thrust bearing and the bearing of said shaft. Due to this arrangement substantial segments of oil under pressure are formed and the thus obtained oil tightness is perfect.

At rest, the source of lubricant under pressure does not discharge lubricant and the pressure in the oil chamber provided around the driving shaft may fall rapidly, due to the oil leaking away to the side of the drive. But the accumulator maintains under pressure the said segments formed on the portion of the drive shaft. Since the latter is no longer rotating, there is no more demand of oil and the bushing thus formed will be maintained indefinitely, and this the better owing to the fact that on cooling down, the oil becomes more viscous and less and less capable of leaking away between the shaft and bearings.

Further characteristics will result from the following description.

On the annexed drawings, given merely by way of example:

Fig. 1 is a partial longitudinal section of a rotating pump, improved according to the invention;

Fig. 2 is a transverse section of the driving shaft, on line 2—2 of Fig. 1;

Fig. 7 is a partial longitudinal section of an improved pump further comprising an oil accumulator according to the invention;

Fig. 8 is a transverse section on line 8—8 of Fig. 7;

Figs. 9 and 10, similar to Fig. 2, show modifications of the accumulator.

Figure 3:
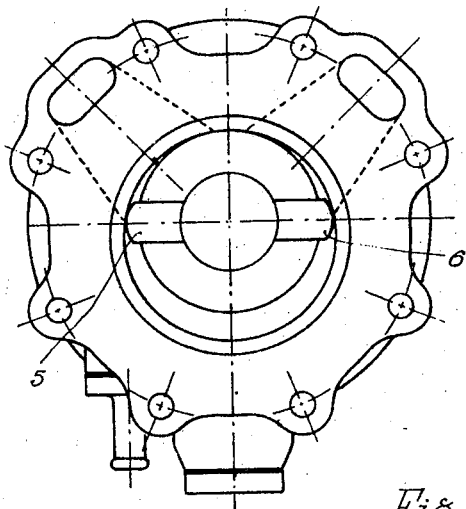
Fig. 3 is a transverse section of the pump body, on line 3—3 of Fig. 1.

According to the embodiment shown in Figs. 1 to 3, to the casing 1 of the pump body is secured, by means of a crown of bolts, the casing 2 containing the pump mechanism and carrying the in- and the outflow nipples for the fluid. Inside the casing 1 there is provided (Figs. 1 and 2) a socket 3, the inside of which constitutes a cylindrical eccentered cavity forming a pump body. The socket 3 also constitutes the bearing of the vane carrying shaft, or rotor 4. The rotor head carries an aperture inside which the vanes 5 and 6 (Fig. 3) move, said vanes being maintained in contact with the socket 3 by means of coil springs.

Figure 5:
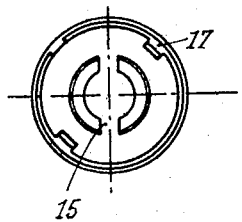
Fig. 5 is an end view of said driving pin.
Figure 4:
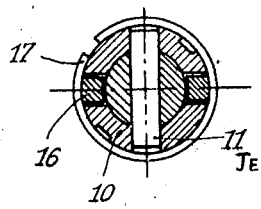
Fig. 4 is a transverse section of the driving pin.

The vane carrying shaft is maintained longitudinally between a faced and ground thrust bearing 9 (Fig. 1), provided in the socket 3, and an annular stop 10 rendered integral with the shaft 4 by means of a pin 11 (Figs. 1-4). The shaft 4 is constantly urged towards the thrust bearing 9 by a spring 12 (Fig. 1) acting by means of a socket 13 upon the stop 10. An end member 14 carrying the driving pin 15 (Figs. 1, 4 and 5) is integral in rotation with the stop 10 by means of two lugs 16 (Figs. 1 and 4) engaging with two corresponding notches provided on the annular stop 10. The end member 14 and the stop 10 are rendered integral longitudinally by a brake 17 (Figs. 1, 4 and 5). This mounting actually constitutes a link of the broken joint type (the Oldham link type) between the driving pin and the shaft 4 and permits to avoid, on one hand, the drawbacks resulting from an eventual misalignment between the driving pin and the pump rotor, and, on the other hand, the alteration of the fluid tight device under the action of the reactions due to the drive.

In shaft 4 (Figs. 1 and 2) there is provided an eccentered part 18 acting as a cam by means of a push rod 19 upon a piston 20, repelled by a spring 21 resting in a plug 22. The push rod 19 and the piston 20 are guided in a cylinder 23 integral with the casing 1. This cylinder 23 communicates through the holes 24 with a cavity 25 provided in the casing 1 and forming a sump. The cylinder 23 further communicates (Fig. 2) with a chamber 26 provided in the bearing 3, by means of a valve constituted for instance by a ball 27 and a spring 28 resting on the plug 29. The flow passes the channels 30 and 31. The chamber 26 further communicates through a channel 32 (Fig. 2) with an automatic draining device. This device is constituted by a conduit 33 fixed in the pump body and comprising a valve 34 (formed by a ball for instance) disposed in such a manner that the spring 35 normally maintains the valve clear of its seat and resting against a block 36. A determined amount of slack exists between the valve 34 and the channel in which it is housed. The conduit 33 communicates with the outside through a channel 37 to which may be adapted a waste tube.

The operation is as follows:

The shaft 4 being driven in a rotary movement by means of the driving pin 15, the pump operates like a normal vane pump, the liquid being drawn in and pumped away under the effect of the motion of the vanes in the eccentered pump body. The outlet pressure is preferably maintained constant by means of a self regulating device contained in the casing 2.

On the other hand, the eccentric 18 acting upon the rod 19 and upon the piston 20 produces a reciprocating motion of the piston. The pump being assumed to be fixed to the engine, the drive is consequently immersed in oil. This oil comes from the splash of the motor itself, or from a suitable oil bath. The oil will gather in chamber 25 and pass through the holes 24 into the cylinder 23 at the end of the suction stroke. It is then taken up by the piston 20 and pumped into chamber 26 of the bearing 3, thereby lifting the valve 27. It therefore ensures perfect lubrication of the rotor shaft rotating in this bearing, under a constant pressure determined by the strength of the spring 21. The ground thrust bearing 9 forms a bushing between the oil and the fuel.

The oil pumped into chamber 26 may also flow away through the channel 32 into the conduit 33 and from here to the outside through the channel 37, since the valve 34 is maintained clear from its seat by the spring 35. But the slack between the valve and its seat being small and the amount of pumped oil comparatively high, the pressure set up by the first strokes of the pump will have the effect, as soon as the air is driven away, to apply with great force the ball against its seat against the action of the spring 35, the strength of which is chosen in proportion. This preliminary evacuation of air ensures a sure and rapid priming of the oil pump and allows the lubricant to arrive immediately around the shaft. It will be understood that the valve thereupon remains applied against its seat during all the time of operation of the oil pump. Actually, during operation, the only flow permitted to the oil is its leakage back to the engine, according to the eventual amount of play between the shaft 4 and its bearing. This leakage being very low and very much less than the output of the oil pump, the latter only effects a very reduced pumping stroke and thus acts as an oil accumulator under constant pressure. The lubricating pressure is, besides, adjusted to a value very much higher than that of the pumped fuel. Even in the event of a bad fluid tightness of the bearing, no fuel leakage will take place around shaft 4 during the operation.

At rest, as the pressure provided by the oil pump drops to zero, the ball 34 will be lifted under the effect of the spring 35, the small amount of oil contained in the conduit will escape through the channel 37 and the oil pump will automatically be set to the atmosphere.

If, at rest, the fuel is under pressure on the pump, it will not be able to flow away, owing to the bushing formed by the fluid tight ground thrust bearing 9. Should, however, accidentally the bushing not be perfectly fluid tight, the fuel, driving the oil before it, or dissolving the latter, will then leak towards chamber 26 and from there to the outside through the conduit 33 and the channel 37. Due to the reduced rate of flow around the ball 34, the amount of leakage is forcibly very low, the ball will not be disturbed and in no event can the fuel leak into the engine on which the pump is mounted.

When the fuel pump is again started, the first strokes of the oil pump produce the evacuation of the air contained in chamber 26, thus permitting a perfect priming of the pump. When the oil arrives, it again urges the ball 34 against its seat and the lubricating pressure rises to a value corresponding to the calibration of the spring of the oil pump.

This automatic setting to the atmosphere of the oil pump at each stop further provides the advantage of renewing, at each new start, the oil contained in the lubricating chamber.

Figure 6:
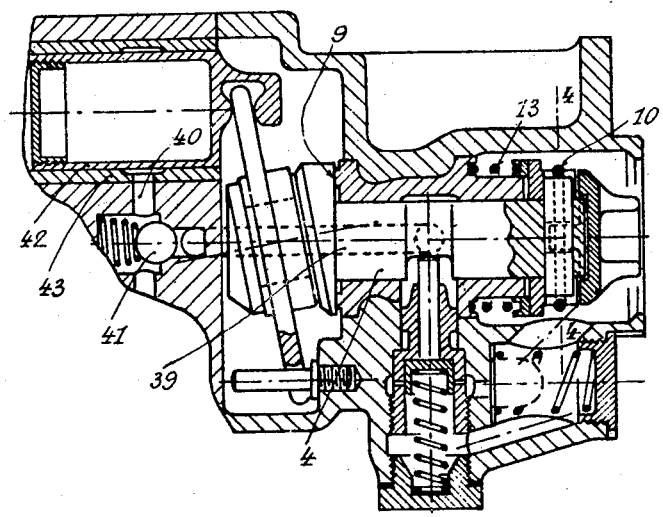
Fig. 6 is a partial longitudinal section of a pump of the reciprocating type, improved according to the invention.

Fig. 6 shows, by way of example, the invention applied to a reciprocating pump of the type comprising a number of parallel pistons actuated by an inclined cam. As will be seen, the arrangements described above may be identically applied. Here again, one finds a driving shaft 4 of the broken link type, comprising a cam actuating a self regulating oil pump. The fluid tightness is obtained by a ground thrust bearing 9 provided on the bearing of the driving shaft, the shaft being maintained on this block by a spring 13 acting upon an annular stop 10. The pump shaft is thus lubrified under pressure.

Furthermore, a by-pass through the channels 39 and 40 and a valve 41 ensures the lubrication of the pistons 42 sliding in the cylinders 43. It is assumed here that the pumped liquid, dissolving or soiling the lubricant and being itself improper for lubrication purposes, there is a need for lubricating the pistons, which are forcibly adjusted very tightly. When the pump is at rest, any return flow of the pumped liquid through the drive of the pump is checked by the valve 41.

The device also comprises the automatic draining mechanism already described for the rotating pump, viz. the device for setting to the atmosphere the output of the oil pump when the pump is at rest, and for evacuating the accidental leakage losses in the case of a bad adjustment of the bearing of the ground thrust bearing 9.

Figs. 7 to 10 show by way of example, a rotary liquid pump further comprising an oil accumulator.

In the embodiment represented, the cavity 26 may either communicate through a hole 26¹ with a conduit providing the oil under pressure by means of a member exterior to the pump, or be supplied with oil under pressure by an auxiliary lubricating pump combined with the liquid pump as above described. Cylinder 23 communicates with the chamber 26, provided in the bearing 3, by means of a valve constituted for instance by a ball 27 and a spring 28 resting on a part 27a and maintained in position by a strong spring 27b located in a plug 29. The flow passes through the channels 30 and 31.

A cylindrical or other capacity 50 communicates with chamber 26 through a channel 51. In this channel there is disposed a valve constituted for instance by a ball 52 urged to rest by a spring 53. This valve allows the oil pumped under pressure into the chamber 26, to penetrate into the accumulator 50, but checks the return flow of said oil towards the chamber 26. The accumulator communicates, on the other hand, through the channels 54, 55, 56 (Fig. 7) with one (or more) groove(s) 57 provided in the fluid tight thrust bearing 9 of the rotor of the main pump.

The operation is as follows:

When shaft 4 is driven round by means of part 14, the oil under pressure arrives into chamber 26 either through the hole 26¹ or from the auxiliary pump combined with the liquid pump as shown.

Furthermore, a certain amount of oil is pumped by the lubricating pump from chamber 26 into the cavity 50 of the accumulator. The air contained in this cavity, unable to escape, will remain imprisoned under pressure above the oil. This oil will fill, through the channels 54, 55 and 56, the groove (or grooves) 57 and thus ensure an efficient lubrication of the thrust bearing 9.

When the pump ceases to operate, the pressure in chamber 26 will drop, the ball valve 52 will close and a certain amount of oil will be held back under pressure in the accumulator 50. The groove (or grooves) 57 will therefore remain filled with oil under pressure and the fluid packing thus formed will check any leakage of fuel towards the bearing and towards the outside of the pump.

In Fig. 9 another embodiment has been shown, in which the accumulator is divided into two chambers 50 and 50¹, by means of yielding wall 60 urged back by a spring 61. The chamber 50¹ communicates with the atmosphere by a hole 62.

In the variant according to Fig. 10, the yielding wall is replaced by a piston 63 urged back by the spring 61.

Obviously, the invention is not limited to the embodiments shown and described, which are given merely by way of example. It will also be understood that the invention may be applied to all the types of pumps (piston, gear and other pumps).

Having now described my invention what I claim as new and desire to secure by Letters Patent is:

1. In combination, a liquid fuel pump comprising a casing and movable means guided in said casing and adapted to circulate liquid fuel into and out of said casing, a bearing in one end wall of said casing and provided on the inner side with a stop surface, a rotary shaft adapted to rotate in said bearing and provided with a shoulder adapted to bear on said stop surface, connecting means between said rotary shaft and said movable means whereby said movable means is operated by said rotary shaft, and spring means bearing on said shaft and adapted to urge said shoulder against said stop surface, a recess in the bottom face of said bearing, a lubricating pump adapted to discharge lubricant under a pressure higher than that of the pumped liquid, conduit means between said lubricating pump and said recess, communicating means between the lower point of said recess and the atmosphere, and valve means in said communicating means yieldingly held in the open position adapted to be brought into the closed position when the lubricant in said communicating means is under pressure, whereby the air is discharged into the atmosphere during priming of said lubricating pump and the liquid fuel from said liquid fuel pump passing accidentally between the contact surfaces between said shoulder and said stop surface, when said lubricating pump is at rest, is discharged into the atmosphere.

2. In combination, a liquid fuel pump comprising a casing and movable means guided in said casing and adapted to circulate liquid fuel into and out of said casing, a bearing in one end wall of said casing and provided on the inner side with a stop surface, a rotary shaft adapted to rotate in said bearing and provided with a shoulder adapted to bear on said stop surface, the contact surfaces between said shoulder and said stop surface being ground and one of said contact surfaces being provided with grooves, connecting means between said rotary shaft and said movable means whereby said movable means is operated by said rotary shaft, and spring means bearing on said shaft and adapted to urge said shoulder against said stop surface, a recess in the bottom face of said bearing, a lubricating pump adapted to discharge lubricant under a pressure higher than that of the pumped liquid, conduit means between said lubricating pump and said recess, communicating means between the lower point of said recess and the atmosphere, and valve means in said communicating means yieldingly held in the open position and adapted to be brought into the closed position when the lubricant in said communicating means is under pressure, a lubricant chamber provided in said casing, other conduit means between the lower part of said chamber and said grooves, other communicating means between said lubricating pump and said chamber, and a check valve in said other communicating means preventing lubricant from returning from said chamber towards said lubricating pump, and maintaining the lubricant under pressure in said chamber.

3. A combination according to claim 2, comprising further a movable partition in said chamber dividing said chamber into two compartments of variable capacity, said other communicating means and said other conduit means ending in one of said compartments, passages between the other compartment and the atmosphere, and yielding means adapted to urge said partition away from the wall of said other compartment opposite said partition.

JEAN LOUIS LÉON ALEXANDRE
ALBERT MOULET.